(12) United States Patent
Naqvi et al.

(10) Patent No.: US 9,174,628 B2
(45) Date of Patent: Nov. 3, 2015

(54) METHOD AND APPARATUS FOR CONTROLLING AN ELECTRICALLY POWERED HYDRAULIC PUMP IN A POWERTRAIN SYSTEM

(71) Applicant: GM GLOBAL TECHNOLOGY OPERATIONS LLC, Detroit, MI (US)

(72) Inventors: Ali K. Naqvi, White Lake, MI (US); Patrick M. Prihoda, Noblesville, IN (US); Eric S. Tryon, Indianapolis, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 93 days.

(21) Appl. No.: 14/068,351

(22) Filed: Oct. 31, 2013

(65) Prior Publication Data

US 2015/0120105 A1   Apr. 30, 2015

(51) Int. Cl.
*B60W 10/08* (2006.01)
*B60W 10/11* (2012.01)
*B60L 15/20* (2006.01)

(52) U.S. Cl.
CPC .............. *B60W 10/08* (2013.01); *B60L 15/20* (2013.01); *B60W 10/11* (2013.01)

(58) Field of Classification Search
CPC . F16H 2059/6861; F16H 59/72; F16H 61/46; B60W 10/08; B60W 10/11; B60L 15/20
USPC ........................................................... 701/22
See application file for complete search history.

(56) References Cited

U.S. PATENT DOCUMENTS

| | | | |
|---|---|---|---|
| 6,799,950 B2 * | 10/2004 | Meier et al. ................... 417/12 |
| 8,038,412 B2 * | 10/2011 | Durtschi ........................ 417/14 |
| 8,668,042 B2 * | 3/2014 | Elliott ........................... 180/339 |
| 2004/0027012 A1 * | 2/2004 | Sangha .......................... 310/58 |
| 2013/0133972 A1 * | 5/2013 | Elliott ........................... 180/337 |

* cited by examiner

*Primary Examiner* — Mary Cheung
*Assistant Examiner* — Michael Berns

(57) ABSTRACT

A powertrain system includes a transmission employing an electrically-powered hydraulic pump providing pressurized hydraulic fluid to a hydraulic circuit. A method of operating the powertrain system includes monitoring a temperature of the hydraulic pump. In response to the temperature exceeding a threshold temperature, power output from an electrically-powered motor coupled to the hydraulic pump is derated, which includes decreasing rotational speed of the hydraulic pump and maintaining hydraulic pressure in the hydraulic circuit.

12 Claims, 3 Drawing Sheets

METHOD AND APPARATUS FOR CONTROLLING AN ELECTRICALLY POWERED HYDRAULIC PUMP IN A POWERTRAIN SYSTEM

TECHNICAL FIELD

This disclosure is related to powertrain systems that employ electrically-powered hydraulic pumps to provide pressurized hydraulic fluid in a system.

BACKGROUND

The statements in this section merely provide background information related to the present disclosure and may not constitute prior art.

Hybrid powertrain systems include internal combustion engines and one or more non-combustion torque machines coupled to a transmission device. Such powertrain systems may transmit torque originating from the engine and the non-combustion torque machine(s) through the transmission device to an output member that may be coupled to a driveline for tractive effort. Control systems for operating such powertrain systems operate the torque-generative devices and apply torque transfer elements in the transmission to transfer torque in response to operator-commanded output torque requests, taking into account fuel economy, emissions, driveability, and other factors. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange between the electrical energy storage device and the electric machines to manage outputs of the transmission, including torque and rotational speed.

SUMMARY

A powertrain system includes a transmission employing an electrically-powered hydraulic pump providing pressurized hydraulic fluid to a hydraulic circuit. A method of operating the powertrain system includes monitoring a temperature of the hydraulic pump. In response to the temperature exceeding a threshold temperature, power output from an electrically-powered motor coupled to the hydraulic pump is derated, which includes decreasing rotational speed of the hydraulic pump and maintaining hydraulic pressure in the hydraulic circuit.

BRIEF DESCRIPTION OF THE DRAWINGS

One or more embodiments will now be described, by way of example, with reference to the accompanying drawings, in which.

DETAILED DESCRIPTION

Figure 1:
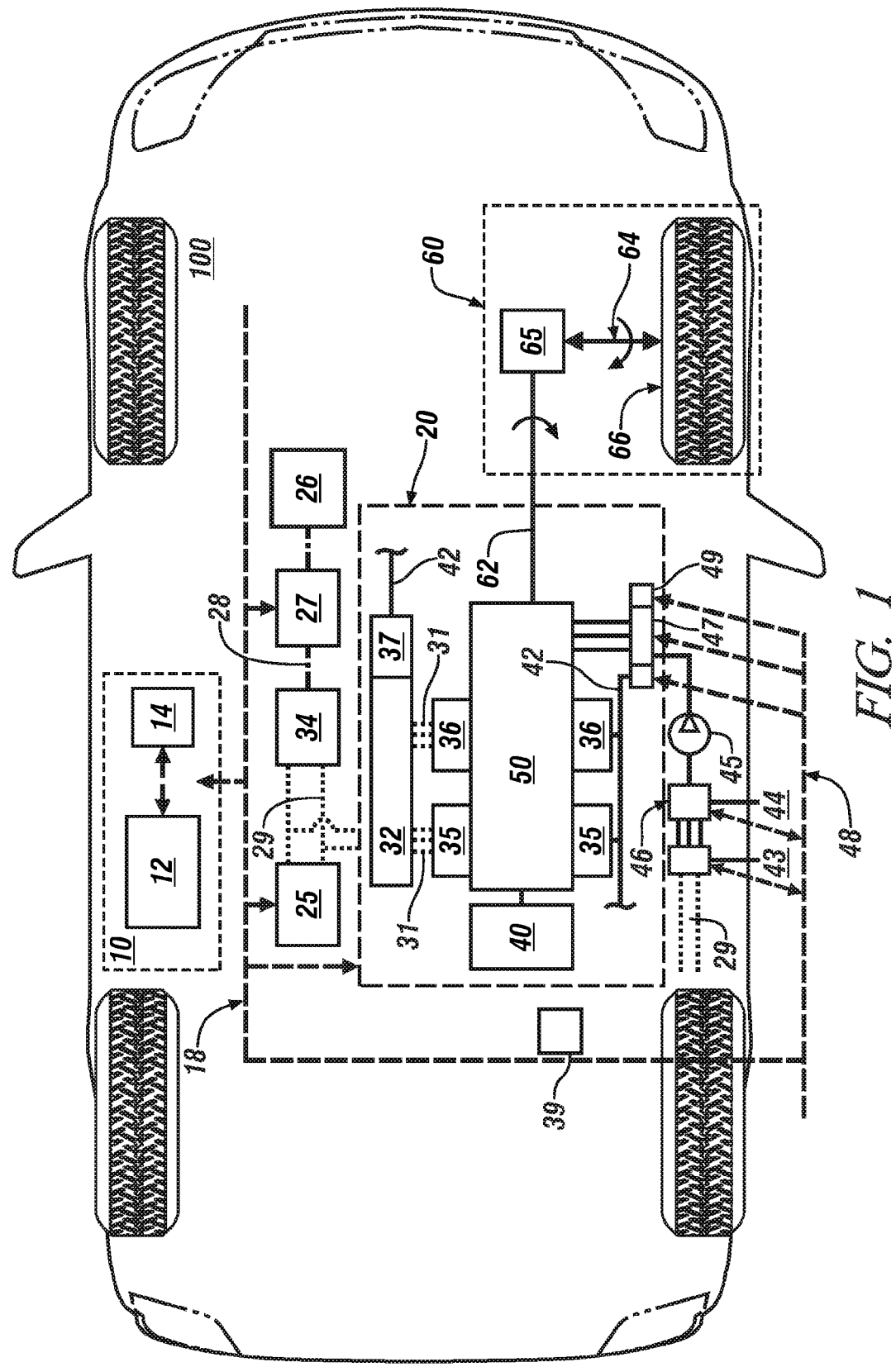
FIG. 1 illustrates a vehicle including a powertrain system having an internal combustion engine that mechanically couples to a transmission and is controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a multi-mode powertrain system 20 including a transmission 50 that employs an electrically-powered hydraulic pump (pump) 46. The pump 46 includes a fluidic pumping element 45 rotatably coupled to a multi-phase electric motor 44 to provide flow of pressurized hydraulic fluid to a hydraulic circuit 47 to effect operation of elements of the transmission 50. Like numerals refer to like elements throughout the description. One embodiment of the multi-mode powertrain system 20 is illustrated. The concepts described herein apply to any powertrain system that employs an electrically-powered hydraulic pump to provide flow of pressurized hydraulic fluid to the transmission 50 and to provide flow of hydraulic fluid to other on-vehicle systems and components for cooling and/or lubrication, examples of which are described herein. As illustrated, the multi-mode powertrain system 20 includes an internal combustion engine (engine) 40, transmission 50, and electrically-powered torque machines 35 and 36. The electrically-powered torque machines 35 and 36 and the internal combustion engine 40 are torque-generating devices. In one embodiment, rotor elements of each of the electrically-powered torque machines 35 and 36 mechanically couple to rotational elements of the transmission 50 and transfer torque thereto. The torque machines 35 and 36, transmission 50 and engine 40 effect torque transfer for tractive torque effort, for engine autostart and autostop maneuvers, to regeneratively brake the vehicle, and for high-voltage electrical charging. The transmission 50 is coupled to a driveline 60, and a control system 10 is configured to control operation. The driveline 60 may include a differential gear device 65 that mechanically couples to an axle 64 or half-shaft that mechanically couples to a wheel 66 in one embodiment. The driveline 60 transfers tractive power between the transmission 50 and a road surface.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form a combustion charge to produce torque in response to an operator torque request. The engine 40 may be configured to execute autostart and autostop control schemes and fuel cutoff (FCO) control schemes during ongoing operation of the powertrain system 10. The engine 40 is considered to be in an OFF state when it is not rotating. The engine 40 is considered to be in an ON state when it is rotating, including one or more FCO states in which the engine is spinning and unfueled. The engine 40 may include a low-voltage solenoid-actuated electrical starter for starting in response to a key-crank event in one embodiment.

The torque machines 35 and 36 are preferably high-voltage multi-phase electric motor/generators that electrically connect to an inverter module 32 that is configured to convert stored electric energy to mechanical power and convert mechanical power to electric energy that may be stored in a high-voltage battery 25. An inverter controller may be colocated with the inverter module 32 (as shown) or, alternatively, may be remotely located, e.g., within control module 12. A high-voltage battery 25 electrically connects to the inverter module 32 via a high-voltage DC bus 29 to transfer high-voltage DC electric power to the torque machines 35 and 36 in response to control signals originating in the control system 10.

The inverter module 32 electrically connects to the torque machines 35 and 36 via a multi-phase motor control power bus 31. The inverter module 32 is configured with suitable control circuits including paired power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machines 35 and 36 to generate torque. Similarly, the inverter module 32 converts mechanical power transferred to the torque machines 35 and 36 to DC electric power to generate electric energy that is storable in the high-voltage battery 25, including as part of a regenerative control strategy. The inverter module 32 is configured to receive motor control commands and control inverter states to provide the motor drive and regeneration functionality. The inverter module 32 and the torque machines 35 and 36 may include a heat exchanger 37 that fluidly couples to a cooling circuit, e.g., a low-pressure sub-circuit 42 fluidly connected to the hydraulic circuit 47 that fluidly connects to the pump 46.

In one embodiment, a DC/DC electric power converter 34 electrically connects to a low-voltage bus 28 and a low-voltage battery 27, and electrically connects to the high-voltage bus 29. The low-voltage battery 27 electrically connects to an auxiliary power system 26 to provide low-voltage electric power to low-voltage systems on the vehicle, including, e.g., electric windows, HVAC fans, seats, and the low-voltage starter.

The transmission 50 preferably employs one or a plurality of differential gear sets and hydraulically-activated clutches to effect torque transfer in one of a plurality of selectable operating modes over a range of speed ratios between the engine 40 and an output member 62. Activation of the clutches is controlled via the hydraulic circuit 47. The transmission 50 can be, for example, an automatic transmission that is configured to automatically shift between a plurality of selectable fixed-gear operating modes and electrically-variable operating modes to operate at a gear ratio that achieves a preferred match between an operator torque request and an engine operating point. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode.

The pump 46 includes the fluidic pumping element 45 powered by the multi-phase electric motor 44 to provide flow of pressurized hydraulic fluid to the hydraulic circuit 47. The multi-phase electric motor 44 electrically connects to an electric inverter module 43 that electrically connects to the high-voltage battery 25 via the high-voltage DC bus 29. The fluidic pumping element 45 includes a shaft-driven positive-displacement pumping element in one embodiment. In one embodiment, the fluidic pumping element 45 is a single pumping element that supplies pressurized hydraulic fluid to both the hydraulic circuit 47 and the low-pressure sub-circuit 42. Alternatively, the fluidic pumping element 45 includes first and second pumping elements, wherein the first pumping element supplies pressurized hydraulic fluid to the hydraulic circuit 47 and the second pumping element supplies hydraulic fluid to the low-pressure sub-circuit 42. Design criteria for the fluidic pumping element 45 and multi-phase electric motor 44 include providing adequate pressurized hydraulic fluid to achieve a target system pressure in the hydraulic circuit 47 to activate one or a plurality of clutches to effect torque transfer and also providing adequate flow of hydraulic fluid to the low-pressure sub-circuit 42 to effect active cooling and lubrication of the torque machines 35 and 36 and the inverter 32 in one embodiment. Other criteria include requirements and constraints associated with packaging, costs, power consumption and operational efficiencies, with an overall goal of providing a pump package that achieves fluidic flow and pressure that are responsive to the system requirements. The fluidic pumping element 45 fluidly connects to the hydraulic circuit 47 to provide flow of hydraulic fluid to elements of the transmission 50, the torque machines 35 and 36, and the heat exchanger 37. In one embodiment, the pump 46 provides pressurized flow of hydraulic fluid to the controllable hydraulic circuit 47 of the transmission 50 to activate selected clutch elements and deactivate other selected clutch elements to effect transmission operation in one of a plurality of transmission operating modes and to provide lubrication to the transmission 50.

The hydraulic circuit 47 preferably includes multiple fluid control valves, electro-mechanical solenoids and the controllable hydraulic pressure regulator 49 that is configured to control magnitude of hydraulic pressure in the hydraulic circuit 47 in response to a control signal 48. The pump 46 may provide flow of hydraulic fluid to a heat exchanger associated with the transmission 50 and, in one embodiment, to the inverter module 32 to provide cooling. The pump 46 provides flow of hydraulic fluid via the low-pressure sub-circuit 42 to the torque machines 35 and 36 to provide cooling and lubrication. A hydraulic pressure regulator 49 is configured to control magnitude of hydraulic pressure in the hydraulic circuit 47. In one embodiment, the control signal 48 can be a pulsewidth-modulated (PWM) control signal for controlling the hydraulic pressure regulator 49 to achieve a preferred hydraulic pressure in the hydraulic circuit 47. In one embodiment, the control signal 48 is responsive to engine rotational speed to achieve the preferred hydraulic pressure.

Allocation of flow of hydraulic fluid from the pump 46 is preferably prioritized. Some amount of the allocated fluidic flow is a result of pump design and manufacturing tolerances, including pumping losses and internal pump leakages. This fluidic flow must be accounted for, but is outside of that pump flow which may be controlled with the controllable hydraulic pressure regulator 49. The pump flow allocation having the highest priority includes supplying pressurized hydraulic fluid to the transmission 50 to activate the hydraulically-activated clutches to effect torque transfer in one of a plurality of selectable operating modes. Pump flow for supplying pressurized hydraulic fluid to the transmission 50 includes pump flow through the fluid control valves of the fluidic circuit 47, some of which may be recoverable for motor cooling, and some of which may be non-recoverable. Other pump flow that is related to supplying pressurized hydraulic fluid to the transmission 50 includes pump flow associated with clutch fill and clutch leakage related to activating the hydraulically-activated clutches. Other pump flow that is related to supplying pressurized hydraulic fluid to the transmission 50 includes pump flow associated with active motor cooling via low-pressure sub-circuit 42 on systems that are configured with one or more of the electrically-powered torque machines 35. The pump flow allocation having the second highest priority is that associated with lubrication including low pressure flow for transmission and motor lubrication and motor cooling flow. Lower priority pump flow allocation includes flow associated with suction from a sump and flow associated with fluidic exhaust from clutches, valves, and the like.

The control system 10 includes control module 12 that signally connects to an operator interface 14. The control module 12 can be a unitary control module that is centrally located to provide operational control of the individual elements of the powertrain system 20, or a plurality of discrete control modules that are co-located with the individual elements of the powertrain system 20 to effect operational control thereof, or some other suitable combination of control modules. The control system 10 may also include hierarchical control of the control modules. The control module 12 preferably signally and operatively connects to individual elements of the powertrain system 20 either directly or via communications bus 18. The control module 12 signally connects to the sensing devices of each of the high-voltage battery 25, the inverter module 32, torque machines 35 and 36, the engine 40, the pump 46 and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

Figure 2:
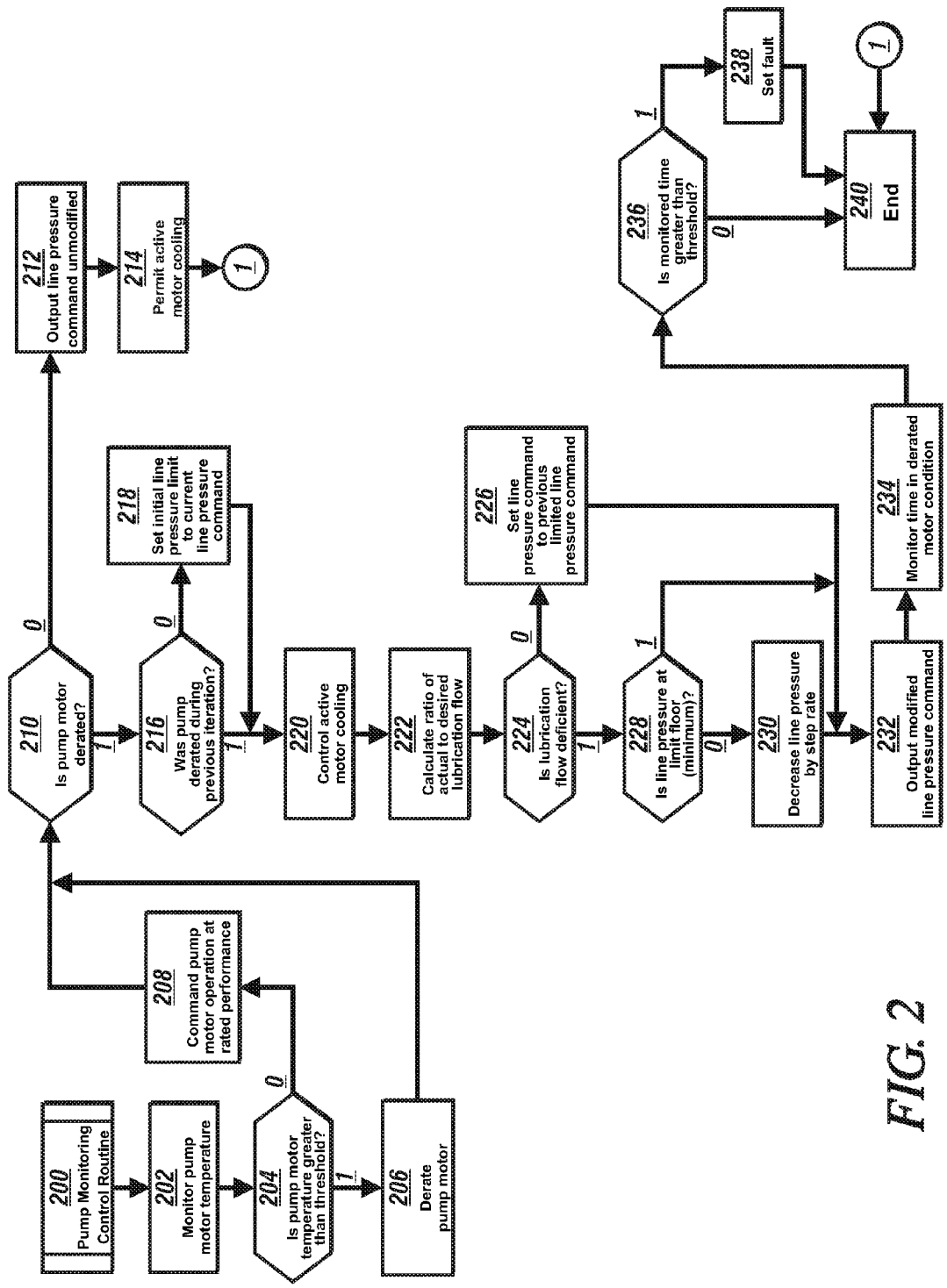
FIG. 2 illustrates a flowchart depicting a pump derate operating scheme for monitoring and controlling an electrically-powered hydraulic pump, in accordance with the disclosure.

FIG. 2 is a flowchart depicting a pump monitoring control routine 200 for monitoring and controlling an electrically-powered hydraulic pump in response to pump motor temperature. The electrically-powered hydraulic pump may be employed in the powertrain system 100 of FIG. 1 to provide pressurized hydraulic fluid to a hydraulic circuit to effect clutch activation in a transmission and to effect cooling and lubrication. Operation of the electrically-powered hydraulic pump is decoupled from operation of the internal combustion engine, unlike operation of a shaft-driven mechanical pump. This decoupling permits designing the pump motor and the pump element to be closely matched to the system pressure and flow requirements without having to accommodate factors associated with engine speed that can affect sizing of a shaft-driven mechanical pump. Designing the pump motor and the pump in a manner that closely matches the system pressure and flow requirements can result in extended operation of the pump motor at high duty cycles and extended operation of the pump at a high percentage of its maximum flowrate. Temperature of the pump motor is regularly monitored, and pump motor operation can be derated for a period of time to ensure that over-temperature conditions are not achieved, with some accommodation to permit sufficient flow of hydraulic fluid for system lubrication and cooling. This may include decreasing line pressure associated with the derated power output from the electrically-powered motor, determining a clutch capacity associated with the decreased line pressure, and controlling clutch activation pressure responsive to the clutch capacity.

Table 1 is provided as a key to FIG. 2 wherein the numerically labeled blocks and the corresponding functions are set forth as follows, corresponding to the pump monitoring control routine 200.

TABLE 1

| BLOCK | BLOCK CONTENTS |
|---|---|
| 200 | Pump Monitoring Control Routine |
| 202 | Monitor pump motor temperature |
| 204 | Is pump motor temperature greater than threshold? |
| 206 | Derate pump motor |
| 208 | Command pump motor operation at rated performance |
| 210 | Is pump motor derated? |
| 212 | Output line pressure command unmodified |
| 214 | Permit active motor cooling |
| 216 | Was pump derated during previous iteration? |
| 218 | Set initial line pressure limit to current line pressure command |
| 220 | Control active motor cooling |
| 222 | Calculate ratio of actual to desired lubrication flow |
| 224 | Is lubrication flow deficient? |
| 226 | Set line pressure command to previous limited line pressure command |
| 228 | Is line pressure at limit floor (minimum)? |
| 230 | Decrease line pressure by step rate |
| 232 | Output modified line pressure command |
| 234 | Monitor time in derated motor condition |
| 236 | Is monitored time greater than threshold? |
| 238 | Set fault |
| 240 | End |

The pump monitoring control routine 200 periodically executes during ongoing vehicle operation, and includes monitoring a temperature of the electrically-powered hydraulic pump that correlates to the pump motor (202) to determine whether pump motor temperature has reached or exceeded a threshold temperature (204). The temperature of the electrically-powered hydraulic pump can be determined by monitoring output of a temperature sensor, by monitoring resistance in electrical wiring windings of the pump motor, by modeling, by estimation, or employing another suitable temperature monitoring mechanism and control routine. The threshold temperature includes a maximum permissible operating temperature for the pump motor, and is calibrated at a level that avoids thermally-induced degradation of components, interfaces and connections in the pump motor and related elements in the electrically-powered hydraulic pump. When the pump motor temperature is less than the threshold temperature (204)(0), the system commands operation of the pump motor at rated performance levels for speed and torque that are responsive to hydraulic pressure and flow demands of the hydraulic system (208). When the pump motor temperature achieves or exceeds the threshold temperature (204)(1), the system derates operation of the pump motor, which includes commanding reduced pump speed and/or pump motor torque levels (206). The reduced pump speed and/or pump motor torque levels cause a reduction in electric power demand by the pump motor, which reduces thermo-electric heating in the pump motor.

The system determines whether the pump motor has been derated (210), and if not (210)(0), a commanded output line pressure is unmodified (212), active motor cooling through the low pressure circuit is permitted (214), and this iteration of the scheme 200 ends (240).

When the pump motor has been derated (210)(1), it determines whether the pump motor was derated the previous iteration (216). If so (216)(1), execution continues. If not (216)(0), an initial line pressure limit is set to a current line pressure command (218) and execution continues. Continued execution includes controlling and managing active motor cooling (220), which can include controlling the hydraulic circuit to decrease or completely disable flow of hydraulic fluid to the low-pressure sub-circuit to disable or decrease active motor cooling.

A ratio is calculated between an actual lubrication flow and a desired lubrication flow (222) to determine whether lubrication flow is deficient (224), i.e., whether there is sufficient flow to all the components for effective cooling and lubrication. The magnitude of lubrication flow that is sufficient is system-dependent and preferably determined as a part of system development and implementation. In one embodiment, when a ratio between the actual lubrication flow and a desired lubrication flow is less than a preferred calibratable magnitude, and remains less than the preferred calibratable magnitude for a period of time that exceeds a calibratable threshold, the line pressure is decreased as described herein. The calibratable ratio and time thresholds are determined to avoid elevated operating temperatures and/or lubrication starvation that reduce service life of the affected components and systems.

When lubrication flow is sufficient (224)(0), the line pressure command is maintained unchanged at a previously limited line pressure command (226). When lubrication flow is deficient (224)(1), it is determined whether the line pressure is at a minimum line pressure (228), and if not (228)(0), the line pressure is decreased in a stepwise manner (230), preferably with a coincident increase in the flow of hydraulic fluid to the low-pressure sub-circuit. When the line pressure is at the minimum line pressure (228)(1), no change is made to the line pressure.

The commanded line pressure is output to control the pump (232) and operation in the derated motor condition is monitored, including monitoring operating time in the derated motor condition (234). This includes determining whether the monitored time in the derated motor condition exceeds a calibrated threshold (236). When operation in the derated motor condition persists for a calibrated period of time without an appropriate decrease in pump motor temperature (236)(1), a code is set indicating presence of a fault associated with the pump (238), and this iteration ends (240). Otherwise (236)(0) this iteration ends without setting a fault (240). In this manner, the system can avoid damage to transmission components due to lack of lubrication and heat rejection.

Figure 3:
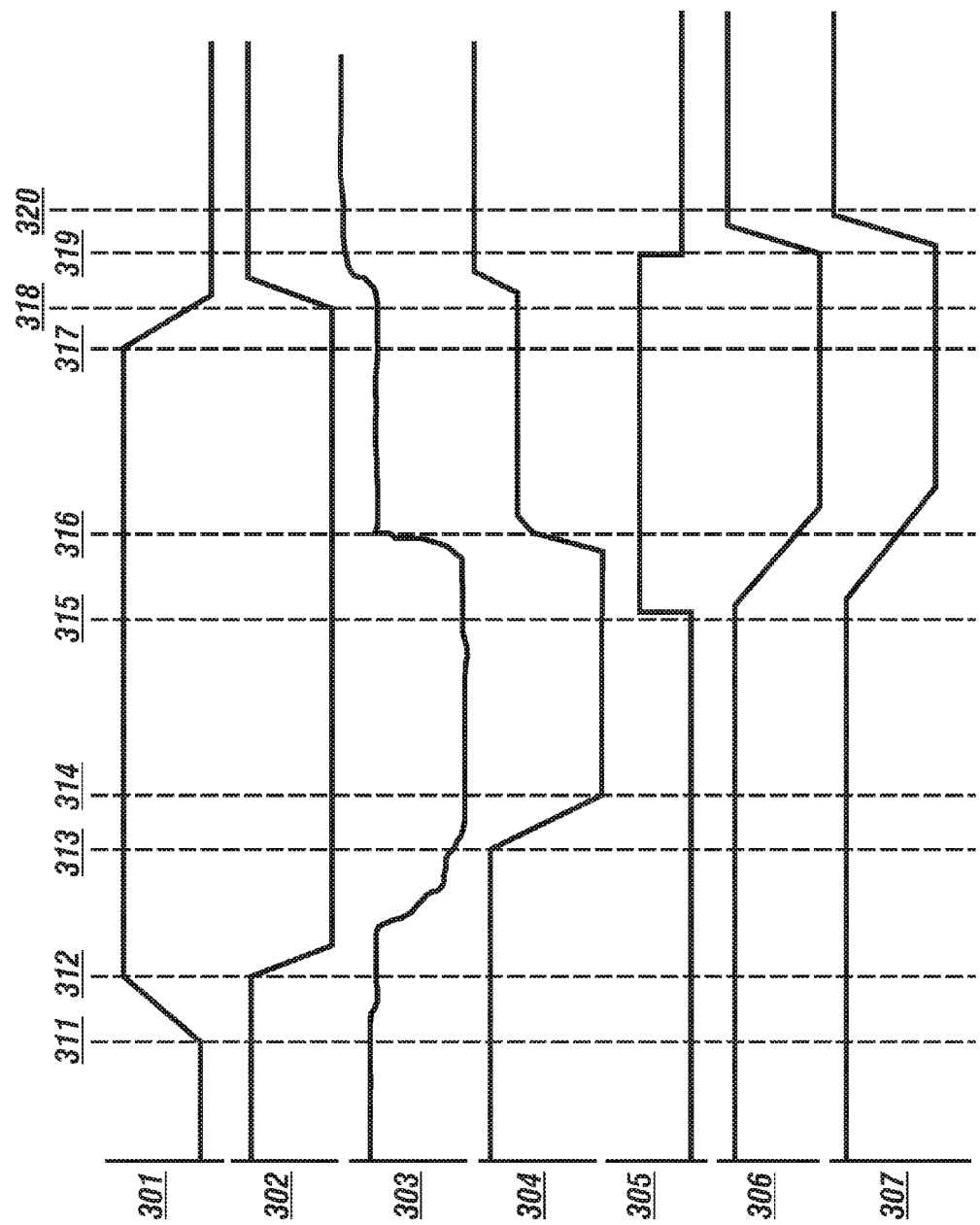
FIG. 3 illustrates parameters associated operation of an exemplary powertrain system executing a pump derate operating scheme in response to pump motor temperature, in accordance with the disclosure.

FIG. 3 graphically shows parameters associated operation of an exemplary powertrain system executing an embodiment of the pump monitoring scheme for monitoring and controlling an electrically-powered hydraulic pump responsive to pump motor temperature. Monitored parameters include pump motor temperature 301, motor derate factor 302, pump speed 303, lubrication flowrate 304, lubrication saver activation 305, line pressure 306, and clutch torque capacity 307. During operation occurring prior to time 311, the pump motor temperature 301 is at or near a nominal temperature, and thus the motor derate factor 302 is at 1.0, indicating motor operation is not derated. The pump speed 303 is relatively high and the lubrication flowrate 304 at a normal or expected flowrate. The line pressure 306 and clutch torque capacity 307 are at normal or expected levels. The lubrication saver activation 305 is inactive.

At time 311, the pump motor temperature 301 begins to increase, but there is no change in control parameters until the pump motor temperature 301 achieves a maximum threshold temperature, which occurs at time 312.

When pump motor temperature 301 achieves the maximum threshold temperature at time 312, the motor derate factor 302 is decreased, indicating that pump operation is derated, resulting in a decrease in pump speed 303. At time 313, the decrease in pump speed 303 reduces to a point that is sufficient to cause a decrease in the lubrication flowrate 304. At time 314, the reduction in pump speed 303 is such that the lubrication flowrate 304 reaches a minimum. Thus far, the line pressure 306 and corresponding clutch torque capacity 307 are unchanged, i.e., there is no reduction in either in response to the decreased pump speed 303.

At time 315, there is an indication that the lubrication flowrate 304 is insufficient, and the lubrication saver scheme 305 is activated, which results in a reduction in the line pressure 306 and corresponding clutch torque capacity 307 to effect an increase the lubrication flowrate 304.

At time 316, the lubrication flowrate 304 achieves a minimum sufficient flowrate, and the line pressure 306 decreases, which causes a reduction in the clutch torque capacity 307. Reducing the clutch torque capacity 307 causes a reduction in the torque transfer capacity of applied clutch(es) in the transmission and thus reduces the maximum torque output from the transmission. At time 317, the pump motor temperature 301 begins to decrease, and at time 318 achieves a reduced temperature with allowable hysteresis that is sufficient to allow an increase in the motor derate factor 302. The lubrication flowrate 304 also increases. At time 319, the lubrication flowrate 304 increases to a rate that permits deactivation of the lubrication saver scheme 305, which causes an increase in the line pressure 306 and a corresponding increase in the clutch capacity 307. At time 320, full operation of the transmission is restored when the clutch capacity 307 achieves its maximum clutch capacity.

This operation permits continued operation of the system with derated pump capacity and reduced clutch capacity with some level of hydraulic fluid flow for lubrication and cooling when pump motor temperature reaches or exceeds a design threshold temperature, thus avoiding excess thermal wear in the components of the transmission and the torque machines that may reduce service life thereof.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including a transmission employing an electrically-powered hydraulic pump providing pressurized hydraulic fluid to a hydraulic circuit, comprising:
   monitoring a temperature of the hydraulic pump; and
   in response to said temperature exceeding a threshold temperature, derating power output from an electrically-powered motor coupled to the hydraulic pump including decreasing rotational speed of the hydraulic pump, decreasing flow of hydraulic fluid to a low-pressure sub-circuit of the hydraulic circuit and maintaining hydraulic pressure in the hydraulic circuit.

2. The method of claim 1, further comprising decreasing the hydraulic pressure in the hydraulic circuit when the flow of hydraulic fluid to the low-pressure sub-circuit is less than a desired flow for a predetermined period of time.

3. The method of claim 2, further comprising increasing the flow of hydraulic fluid to the low-pressure sub-circuit coincident with decreasing the hydraulic pressure in the hydraulic circuit when the flow of hydraulic fluid to the low-pressure sub-circuit is less than the desired flow for the period of time.

4. The method of claim 2, further comprising discontinuing derating power output from the electrically-powered motor coupled to the hydraulic pump including increasing rotational speed of the hydraulic pump, and increasing flow of hydraulic fluid to the low-pressure sub-circuit of the hydraulic circuit when the temperature of the hydraulic pump is less than the threshold temperature.

5. The method of claim 2, wherein decreasing the hydraulic pressure in the hydraulic circuit comprises reducing clutch torque capacity of applied clutches in the transmission that are fluidly connected to the hydraulic circuit.

6. The method of claim 1, wherein monitoring the temperature of the hydraulic pump comprises monitoring a temperature of the electrically-powered motor rotatably coupled to the hydraulic pump.

7. The method of claim 1, wherein the powertrain system further comprises torque machines configured to transfer torque to the transmission and the low-pressure sub-circuit of the hydraulic circuit is configured to effect flow of hydraulic fluid to the torque machines to effect active cooling and lubrication; and
   wherein decreasing flow of hydraulic fluid to the low-pressure sub-circuit of the hydraulic circuit comprises decreasing the flow of hydraulic fluid to the torque machines.

8. Method for operating a multi-mode powertrain system including a transmission mechanically coupled to electrically-powered torque machines, said transmission employing an electrically-powered hydraulic pump providing pressurized hydraulic fluid to a hydraulic circuit, the method comprising:
   derating power output from an electric motor rotatably coupled to the hydraulic pump including decreasing rotational speed of the hydraulic pump, decreasing flow of hydraulic fluid to a low-pressure sub-circuit of the hydraulic circuit and maintaining hydraulic pressure in the hydraulic circuit when a temperature of the electric motor exceeds a maximum threshold temperature; and
   discontinuing the derating power output from the electric motor when the temperature of the electric motor is less than the maximum threshold temperature.

9. The method of claim 8, further comprising decreasing the hydraulic pressure in the hydraulic circuit when the flow of hydraulic fluid to the low-pressure sub-circuit is less than a desired flow for a period of time and the temperature of the electric motor continues to exceed the maximum threshold temperature.

10. The method of claim 9, further comprising increasing the flow of hydraulic fluid to the low-pressure sub-circuit coincident with the decreasing the hydraulic pressure in the hydraulic circuit when the flow of hydraulic fluid to the low-pressure sub-circuit is less than the desired flow for the period of time the temperature of the electric motor continues to exceed the maximum threshold temperature.

11. The method of claim 9, wherein decreasing the hydraulic pressure in the hydraulic circuit comprises reducing clutch torque capacity of applied clutches in the transmission that are fluidly connected to the hydraulic circuit.

12. The method of claim 8, wherein discontinuing the derating power output from the electric motor when the temperature of the electric motor is less than the maximum threshold temperature comprises increasing rotational speed of the hydraulic pump and increasing flow of hydraulic fluid to the low-pressure sub-circuit of the hydraulic circuit when the temperature of the hydraulic pump is less than the threshold temperature.

* * * * *